United States Patent [19]

Mann et al.

[11] Patent Number: 4,583,425
[45] Date of Patent: Apr. 22, 1986

[54] COMPACT HYDRAULIC DRIVE MECHANISM FOR WHEEL ASSEMBLIES

[75] Inventors: Egon Mann; Helmut Eymuller, both of Friedrichshafen, Fed. Rep. of Germany

[73] Assignee: Zahnradfabrik Friedrichshafen AG, Fed. Rep. of Germany

[21] Appl. No.: 606,823

[22] PCT Filed: May 11, 1983

[86] PCT No.: PCT/EP83/00125
§ 371 Date: Apr. 25, 1984
§ 102(e) Date: Apr. 25, 1984

[87] PCT Pub. No.: WO84/01136
PCT Pub. Date: Mar. 29, 1984

[30] Foreign Application Priority Data

Sep. 24, 1982 [DE] Fed. Rep. of Germany ....... 3235378

[51] Int. Cl.$^4$ ............................................ F16H 47/00
[52] U.S. Cl. ...................................... 74/730; 91/499
[58] Field of Search ................. 74/730, 655, 720; 180/10, 9-62; 91/499, 473

[56] References Cited

U.S. PATENT DOCUMENTS

| | | | |
|---|---|---|---|
| 3,439,766 | 4/1969 | Dence et al. | 91/499 X |
| 4,114,737 | 9/1978 | Fukui | 91/499 X |
| 4,207,804 | 6/1980 | Fukui | 91/499 |
| 4,271,725 | 6/1981 | Takao et al. | 74/730 |
| 4,275,616 | 6/1981 | Ehrlinger et al. | 74/730 |

FOREIGN PATENT DOCUMENTS

| | | | |
|---|---|---|---|
| 2130513 | 12/1972 | Fed. Rep. of Germany | 91/473 |
| 2758556 | 7/1979 | Fed. Rep. of Germany | 74/730 |
| 2831458 | 1/1980 | Fed. Rep. of Germany | . |
| 2330921 | 6/1977 | France | 74/730 |

*Primary Examiner*—George H. Krizmanich
*Assistant Examiner*—Dirk Wright
*Attorney, Agent, or Firm*—Hayes, Davis & Soloway

[57] ABSTRACT

A driving mechanism, specially for use as tractor motor or servomotor, is made specially compact and makes possible the use of a simple, flat main wheel such as a sprocket. The compact construction is obtained by a few structural parts mostly made of one piece such as a hollow wheel for torque delivery and assembly of the main wheel driven by the mechanism and a hub support for carrying the hollow wheel and gear cap with simultaneous support for part of the gearing. A sound-insulated hydromotor is accommodated in the interior of the driving mechanism, a safety brake surrounds part of the hydromotor so as to result in a space-saving construction. Since the driving mechanism is axially not longer than the width of a tractor chain, it remains well protected when it serves as driving motor in a caterpillar vehicle.

11 Claims, 1 Drawing Figure

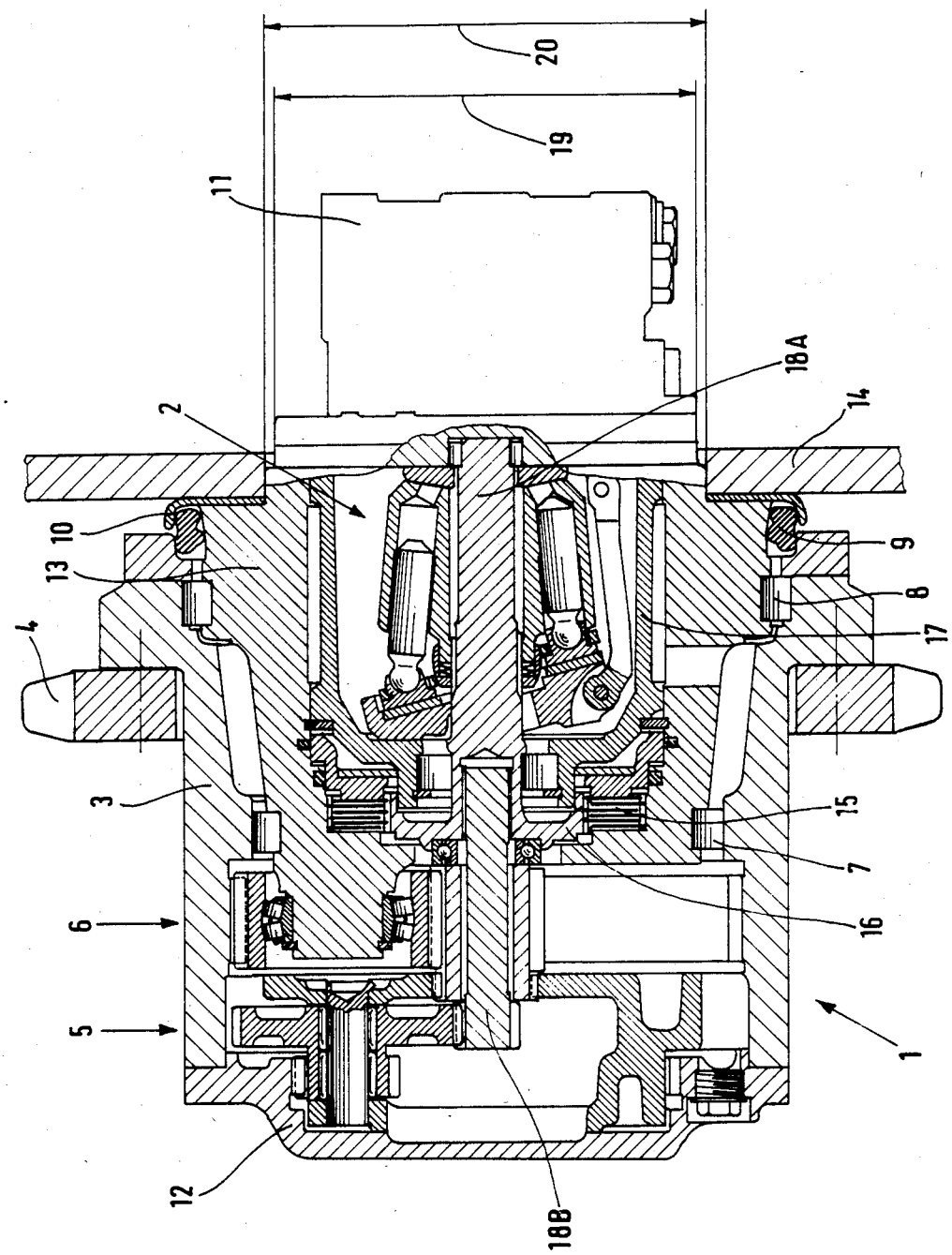

COMPACT HYDRAULIC DRIVE MECHANISM FOR WHEEL ASSEMBLIES

The invention relates to a driving mechanism, specially for use as traction motor or servomotor in a working vehicle, including a hydromotor, at least one planetary gear connected at the output and a hollow wheel for torque delivery and a driven main wheel assembly.

Our German laid-open application No. 28 31 458 has disclosed a wheel drive including a hydromotor, planetary gearing connected at the output and a hollow wheel for torque delivery and assembly of a driven main wheel. The latter must be very strongly offset to enable it for its part to deliver torque substantially centrally in the axial direction of the wheel drive. This circumstance implies an expensive installation of the driven main wheel. For the support of the hydromotor and planetary gearing, the already known wheel drive comprises a multiplicity of separate parts. This makes the production of the known drive very costly and maintenance works are made difficult or cannont be carried out at all without disassembling the known drive.

U.S. Pat. No. 4,271,725 has disclosed a motor unit that likewise comprises a hydromotor and planetary gearing connected at the output side. In the known mechanism the longitudinal axis of the hydromotor is angularly displaced with respect to the longitudinal axis of the gearing connected at the output, since this makes the hydromotor at least partly accessible for maintenance works past the control cap associated with the hydromotor. Although a hollow wheel for torque delivery and assembly of a driven main wheel is designed so as to make no longer necessary an offset main wheel made in a costly manufacturing process, the two-part design of the hollow wheel increases the production expenses thereof. Due to the accommodation of the hydromotor, the noise of its operation can escape to the outside unhindered. Its construction as constant motor allows no control in the known drive. Separate bearings are needed for each gear wheel and for this reason and owing to the angularly displaced axis of the hydromotor in respect to the driving longitudinal axis, the known drive needs relatively much assembly space.

The invention is based on the problem of providing a driving mechanism, specially for use as a traction motor or servomotor in working vehicles, that has a compact construction, is amenable to servicing, allows the mounting of a simple main wheel such as a dredging wheel constructed as simply as possible, and is made as soundproof as possible. The driving mechanism must have the smallest possible outer dimensions so as not to project sidewise beyond the width of a track wheel of a caterpillar excavator.

This problem is solved by the features stated in the characteristic part of Claim 1.

The invention has a series of advantages in comparison with the already known drives. Thus, the low-cost production of the driving mechanism is already made possible by the fact that there is provided for absorbing the bearing pressures from the outside a hub support that in addition can also serve as support member for a planetary gearing at the driving side, that is further an assembly frame for part of the brake, and that also keeps the hydromotor in place and overlaps the whole longitudinal extension thereof. Hereby the hydromotor is also effectively checked as to noises.

According to an embodiment of the invention, the hollow wheel rotates on two bearings that for their part are supported on the hub support. More bearings or additional extensions of the hollow wheel are not needed here like they are in the already known objects.

According to another embodiment of the invention, the hollow wheel is closed at the front by a gear cap. By virtue of this step it is possible to reduce the production cost of the tractor motor and to broaden the possibilities for maintenance works and for the exchange of gear parts in order, for instance, to change the gear transmission, for after removing the gear cap, the gear mechanics with the planetary gear is immediately exposed.

Another embodiment of the invention contemplates that between the hollow wheel and the hub support there be provided a one-piece roller bearing. This makes possible considerable savings in the production and a high stress of the hollow wheel.

According to another embodiment of the invention, the brake is situated around a bearing of the hydromotor. This feature makes it possible to keep the space for the brake within very narrow limits.

Another embodiment of the invention contemplates that the housing of the hydromotor extends into an inner support of the brake. This step also increases the possibilities of making the driving motor very compact and of short axial length.

According the another embodiment of the invention, the shaft that leads from the hydromotor to the planetary drive is disposed axially in respect to the hydromotor whereby it is possible to obtain a simple connection of the hydromotor with the driving shaft, since as stub shafts both have to be only fitted into one another. This simplifies the assembly in the production and facilitates the servicing that will be eventually needed later, since for disassembling purposes the hydromotor as a unit is pulled down only by the driving shaft and needs only be inserted or pushed for assembling purposes.

According to another embodiment of the invention, the hub support is made of one piece. Unlike the prior art, where the corresponding structural parts are made of several pieces, there result from the invention a substantial simplification regarding the assembly in the course of production and a good blockage of the noises of the hydromotor that escape to the outside.

Another embodiment of the invention contemplates that the hydromotor be enclosed by the hub support, the frame for assembling the driving motor and the control cap of the hydromotor. This step also serves for preventing that the noises of the hydromotor escape outside, specially when the driving motor is embedded in the working machine in question or in the corresponding working vehicle, since the frame closes the apertures that still remain in the hydromotor.

According to one embodiment of the invention, the brake is situated between the hydromotor and the consecutive mechanical gear. Disposing the brake in this place results in that the brake can be more effectively inserted than would be possible at the exit of the driving mechanism.

According to another embodiment of the invention, the diameter or corresponding outer contour of the control cap is smaller than the center diameter of the driving mechanism. Only hereby is it possible to insert as a whole the complete driving mechanism, that is, with assembled control cap. Accordingly, the driving mechanism can be assembled and disassembled as a unit.

Another embodiment of the invention provides that the hydromotor and the gearing mechanism (planetary gearing) belong the same oil supply. Hereby a change of oil for the mechanical gearing is unnecessary.

Other advantageous embodiments of the invention result from the specification that follows and the drawing.

The invention is explained in an exemplified embodiment with reference to the drawing. The drawing shows a section through the driving mechanism according to the invention.

The driving mechanism 1 essentially comprises a hydromotor 2, planetary gearings 5, 6 connected at the outlet of the hydromotor and a hollow wheel 3 for assembly to a driven main wheel such as a sprocket 4 for driving a caterpillar track. In this type of assembly the sprocket can be made flat and needs no offsetting.

The hollow wheel 3 is supported by two bearings 7, 8 on a hub support 13. The driven main wheel, that is, the sprocket 4 in the embodiment, is mounted at a place between the two bearings 7, 8. The latter can be designed as one-piece roller bearings.

The hub support 13 is made of one piece and serves, together with the bearing of the hollow wheel 3, as the bearing of a planetary gearing 6. In addition, the hub support 13 carries part of a brake 15 that in the embodiment is installed or used as safety laminated brake.

A gear cap 12 is situated on the hollow wheel 3 and therefore rotates therewith. When the gear cap 12 is removed, the gear mechanism is exposed. Gear parts can be easily inspected, serviced and exchanged.

A shaft 18A of the hydromotor 2 and a shaft 18B of the planetary gearing form together the main shaft of the driving mechanism. Both shafts 18A, 18B are put together only when assembling the driving mechanism. For maintenance this provides the advantage of enabling removal from the driving mechanism, the hydromotor 2 that has been constructed as a unit. The brake 15 is then accessible and can be serviced.

Since in addition a control cap 11 for the hydromotor 2 forms therewith a structural unit, the control cap 11 and the hydromotor 2 can even be withdrawn together from the driving mechanism or inserted therein.

The hydromotor 2 has a separate housing 17 that ensures the limitation of its noises to the outside. An additional noise insulation results from the fact that the hydromotor 2 together with its housing 17 is enclosed by additional structural parts, namely, the hub support 13, the frame 14 to which the driving mechanism 1 is secured and the control cap 11. Sound-insulating means can be encapsulated respectively between the housing 17 of the hydromotor 2 and the hub support 13, or frame 14, or control cap 11.

A gasket 9 can easily be serviced by removing a cover plate 10 when the driving mechanism is disassembled. The gasket 9 is then exposed and can be restored, for instance.

To the brake 15 belongs also an inner support 16 such as an inner laminated support of a laminated brake. The inner support 16 overlaps part of the housing 17 of the hydromotor 2, and this feature contributes to the objective of making the driving mechanism as compact as possible and axially short.

The gear mechanism, that is, chiefly the planetary gearing 5, 6 and the hydromotor 2, have a common oil supply. Therefore, it is unnecessary to change the oil of the mechanical gearing.

Since the driving mechanism is made relatively short axially, when it is used as tractor motor in a tractor chain vehicle such as a caterpillar excavator, it does not extend beyond the track width and is therefore protected.

The driving mechanism 1 can be assembled and disassembled as a complete unit, since one diameter 19 of the control cap 11 is lesser than a center diameter 120 of the driving mechanism.

We claim:

1. A driving mechanism, for use as a traction motor in a working vehicle, including a housing 17 encompassing a hydromotor (2), said hydromotor (2) having a rotary output means (18A, 18B), at least one planetary gearing (5 or 6) connected to the outlet means to drive a hollow wheel means (3) adapted for torque delivery to a main driving wheel of said vehicle, wherein for absorbing external bearing pressures the hollow wheel is supported by bearings (7, 8) on a hub support (13) which also serves as a supporting member for said planetary gearing, and which encompasses and supports said support (17), containing said hydromotor (2), and a transmission brake (15) disposed axially of said hydromotor and said brake (15) is situated around a bearing of said hydromotor (2).

2. A driving mechanism according to claim 1 wherein said hollow wheel means (3) is closed at one axial end thereof by a cap means (12).

3. A driving mechanism according to claim 1, wherein a said bearing is a one-piece roller bearing.

4. A driving mechanism according to claim 1, wherein the hydromotor has a housing (17) which extends into an inner support (16) of said brake (15).

5. A driving mechanism according to claim 1, wherein said hydromotor output means is a shaft (18A, 18B) that extends axially of said hydromotor (2) to said planetary gearing (5 or 6).

6. A driving mechanism according to claim 1, wherein said hollow wheel (3) is monolithic.

7. A driving mechanism according to claim 1, wherein said hub support (13) is monolithic.

8. A driving mechanism according to claim 1, wherein said hydromotor (2) is enclosed by said hub support (13), a frame (14) for supporting the driving mechanism and a control cap (11) of said hydromotor.

9. A driving mechanism according to claim 1, wherein said transmission brake (15) is situated between said hydromotor (2) and the planetary gearing (5).

10. A driving mechanism according to claim 1, wherein said hydromotor (2) and said planetary gearing (5) share the same oil supply.

11. A drive mechanism according to claim 1, wherein said bearings (7, 8) are disposed between said hollow wheel means (3) and said hub support (13) so that said bearings (7, 8) turn directly on an external surface of said hub support (13) and on an internal surface of said hollow wheel means (3).

* * * * *

UNITED STATES PATENT AND TRADEMARK OFFICE
CERTIFICATE OF CORRECTION

PATENT NO. : 4,583,425

DATED : April 22, 1986

INVENTOR(S) : Egon MANN and Helmut EYMULLER

It is certified that error appears in the above—identified patent and that said Letters Patent is hereby corrected as shown below:

Claim 1, column 4, lines 27-28, delete the word "support" and insert in place thereof --housing--.

Signed and Sealed this

Second Day of September 1986

[SEAL]

Attest:

DONALD J. QUIGG

Attesting Officer     Commissioner of Patents and Trademarks